US007117393B2

(12) United States Patent
Baba et al.

(10) Patent No.: US 7,117,393 B2
(45) Date of Patent: Oct. 3, 2006

(54) FAILOVER METHOD IN A REDUNDANT COMPUTER SYSTEM WITH STORAGE DEVICES

(75) Inventors: Tsunehiko Baba, Kokubunji (JP); Shinji Fujiwara, Sagamihara (JP); Yoshio Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 10/834,979

(22) Filed: Apr. 30, 2004

(65) Prior Publication Data

US 2005/0050392 A1 Mar. 3, 2005

(30) Foreign Application Priority Data

Aug. 26, 2003 (JP) ............................. 2003-300713

(51) Int. Cl.
*G06F 11/00* (2006.01)
(52) U.S. Cl. .......................................... 714/25; 714/13
(58) Field of Classification Search ................. 714/25, 714/6, 8, 13, 42
See application file for complete search history.

(56) References Cited

U.S. PATENT DOCUMENTS

| 5,841,963 | A | 11/1998 | Nakamikawa et al. |
| 5,907,673 | A | 5/1999 | Hirayama et al. |
| 6,275,953 | B1 * | 8/2001 | Vahalia et al. ................. 714/11 |
| 6,401,178 | B1 | 6/2002 | Gagne et al. |
| 6,629,264 | B1 * | 9/2003 | Sicola et al. ................... 714/15 |
| 6,816,891 | B1 * | 11/2004 | Vahalia et al. ............... 709/214 |
| 6,823,477 | B1 * | 11/2004 | Cheng et al. .................. 714/26 |
| 6,865,597 | B1 * | 3/2005 | Bandopadhyay et al. ... 709/213 |
| 2004/0117687 | A1 | 6/2004 | Smith |
| 2004/0230625 | A1 | 11/2004 | Baba et al. |
| 2004/0260977 | A1 * | 12/2004 | Ji et al. ......................... 714/36 |
| 2005/0015657 | A1 | 1/2005 | Sugiura et al. |
| 2005/0262298 | A1 * | 11/2005 | Lubbers et al. ............. 711/112 |

FOREIGN PATENT DOCUMENTS

JP 2001-134456 5/2001

\* cited by examiner

*Primary Examiner*—Nadeem Iqbal
(74) *Attorney, Agent, or Firm*—Mattingly, Stanger, Malur & Brundidge, P.C.

(57) ABSTRACT

A high availability database system, subject to a failure causing data corruption in the active server system, may recover valid data prior to the corruption, and use the protected and recovered data to effect a failover. At the time when a stand-by computer system detects occurrence of a failure, a pair split is done to the data area to protect the data area data of time T0, just before the occurrence of the failure, and another pair split is done to the log area at the time, where the log area is corrupted or a time T3, where the failover is to take effect without corrupting data, to protect the log area containing data at a given time between time T0 and time T3. By using the data and log areas thus protected, the stand-by computer system may take over valid data and log areas to perform a failover.

5 Claims, 12 Drawing Sheets

FAILOVER METHOD IN A REDUNDANT COMPUTER SYSTEM WITH STORAGE DEVICES

CROSS-REFERENCE TO RELATED APPLICATION

This application is related to a U.S. application Ser. No. 10/766,802, filed Jan. 30, 2004, entitled "Method, Apparatus and Computer Readable Medium for Managing Multiple System", the disclosure of which is hereby incorporated by reference.

CLAIM OF PRIORITY

The present application claims priority from Japanese application JP2003-300713, filed on Aug. 26, 2003, the content of which is hereby incorporated by reference into this application

FIELD OF THE INVENTION

The present invention is related to a computer system with a fault tolerance for building a data base system; and, in particular, the invention is relates to a computer system incorporating a program that prevents the contents of a replicated volume from being destroyed, among volumes available to execute a volume replication procedure, in a case in which the computer program or operating system performing the volume replication procedure between a pair of volumes has failed.

BACKGROUND OF THE INVENTION

In the recent times, the computer system has become necessary in the infrastructure of our daily life as a support for daily activities. The computer system is required to operate 24 hours a day, without interruption, to continuously provide its service. For example, an online banking system has a database task as an essential operation. The database system is not permitted to be halted so as to allow for continuous updating.

In a computer system requiring such a high reliability, which is not allowed to be halted for a moment, the system currently performing tasks (currently active computer system) typically has a backup computer system, which operates to stand by as a replacement to take over a job in an event that the active system experiences a failure. The failover procedure from the detection of a failure found in the active system up to the replacement with the backup, stand-by, system is provided by a cluster program. In order to take over the process, any data used in the application and operating system has to be carried over. For example, in the database system as described above, the information on the volume in which the data to be processed is stored must be carried over.

However, the detection of a fault in the cluster program is programmed so as to prevent the taking over of tasks due to a temporal error or a mistakenly detected failure, such that the tasks are taken over to the stand-by system only when the failure is detected repeatedly a given number of times. As a result, there exists a delay from the first detection of failure to the actual take-over of the system process. If the failure which has occurred in the active system is destructive due to a bug in an application or due to a runaway condition of the system, then some of the data will be destroyed during this period, so that the destroyed data will not be recoverable. Therefore, there is a problem that the stand-by system cannot efficiently take over the processing of the data.

A database system stores data in a volume (VOL) created on a disk for performing its processing. For this, a data protection technique, which involves creation of a replication of the VOL by the disk drive device, has been widely used. For example, JP-A No. 134456/2003 discloses a system in which two computer systems each have a disk drive device, both devices being interconnected to perform a replication of a VOL in either disk. In this system, the primary volume, which represents the source of data, is connected to the active computer system, and the secondary volume or the destination of the data is connected to the backup system independently, so that there must be a disk-to-disk communication procedure. In this system, there is a problem that the disk replication is not properly completed in case of a failure of abnormal disk-to-disk communication, not to mention the case of a bug in an application or a runaway condition.

U.S. Pat. No. 6,401,178 discloses a system in which data replication is performed within a disk drive. When applied to a VOL, a replica of the VOL is created in the disk so that no communication error exists between disks. The VOL replication procedure consists of a pair configuration and a pair split, aimed at a pair of VOLs of the primary VOL or the source of data and the secondary VOL or the destination. A pair configuration is a means for generating rapidly a secondary VOL or a replica of the primary VOL by synchronizing every data including the physical volume identifier (PVID) and the volume information. Thus, a pair is configured, the PVIDs of both primary and secondary VOLs are the same, and the VOLs are treated as one single VOL from the superior computer system. On the other hand, pair splitting is a process that rewrites the PVID of a secondary VOL to another PVID that is different from that of the primary VOL, for the paired VOLs. The paired VOL, which is seen as one single VOL from the superior computer system, can appeared as two separate VOLs in the pair split status. These two means provide for generation of a replication of a primary VOL and for providing a functionality of operating a thus created replica, a secondary VOL, from the computer system.

A method in which data to be taken over may be protected by shadowing the data from the primary vol to the secondary vol by using this volume replication function, in order to recover from the non-corrupted status, can be devised, however, there will be problems in such method. First, if the data replication is enabled, corrupted data may be copied to the destination so that the data in the secondary vol, the subject to be protected, may also be corrupted. Second, if the data capacity is huge in such a case as a database system, the backup process may take a few hours, resulting in a difficulty of frequent backup operations. In addition, there also is another problem in that the recovery of the data status at the time of failure from the backup data may involve a lot of time and effort.

The prior methods, as described above, have the following problems: When a system failure occurs in the active/backup computer systems having commonly shared primary and secondary VOLs that are subject to be replicated therebetween (pair configuration/pair split), and when the stand-by system takes over the process in the active system, if a failure that has occurred in the active computer system involves data corruption, the data to be taken over may be subject to the risk of corruption, so that the fail-over will have failed. This means that, in the failover system, the stand-by system takes over the process and protects data required for the failover by detecting the occurrence of a failure in the active computer system. If there is a failure involving data corruption, the failover works only after the data has been corrupted. When the data has been corrupted, valid data should be recovered from the backup. However, as the amount and capacity of data is continuously increasing, the complete backup interval is set longer, so that the time taken for the recovery of valid data immediately prior to a failure will be enormously long.

As can be seen from the foregoing, the methods employed heretofore have a problem of requiring an enormous time for recovering the same data along with a valid system in case of a failure that involves data corruption, when using a cluster system for the purpose of increased reliability.

SUMMARY OF THE INVENTION

Accordingly, the primary object of the present invention is to provide a system in which a stand-by computer system takes over a process by using data in a secondary VOL that is generated by a VOL replication, in a case in which the stand-by computer system detects a failure in the active computer system with a cluster program.

More specifically, the present invention provides a system which provides for securing a recovery to valid data status as well as performing a failover to a stand-by system in connection with a failure that may corrupt data.

The secondary object of the present invention is to provide a method and a system that provide for protecting data in a database system at the moment of first detection of a system failure of the active system by a backup, stand-by system using a cluster program, and protects a log area of the database system at the moment of Nth detection of a system failure, at which time failover has taken effect, in order to take over the process using the thus protected data area and log area by the stand-by computer system.

The third object of the present invention is to provide a disk drive device having a storage area for temporarily saving the writing to a VOL area on the disk, a means for actually writing to the VOL area the contents of the storage area, a means for reading out the contents of the VOL area with the contents in the storage area that has been written to the VOL area, and a means for reading out the contents of the VOL area.

The fourth object of the present invention is to provide a method and a system for notifying the disk drive device of the third object of the normal operation of the active computer system using the cluster program for assuring that data capable of properly running the active computer system is written in the VOL area on the disk.

The fifth object of the present invention is to provide a disk drive device capable of access control of the VOL area by registering the accessing pattern of the dominant server to the VOL area on the disk and of notifying the dominant server of an access violation.

The sixth object of the present invention is to provide a method and a system for a database system for protecting the log area of a database by means of the disk drive device of the fifth object.

The seventh object of the present invention is to provide a method and a database system using the second, fourth and sixth methods and means for protecting data immediately before a failure in the active computer system into a secondary VOL generated by using a VOL replication means, for allowing the stand-by computer system to use the protected data in order to fail over the process beginning with the normal operation status immediately before the failure.

The present invention provides a failover function in a high availability computer system, including an active computer system and a stand-by computer system, which shares a pair of VOLs that are subject to VOL replication between the active and stand-by systems, for preventing data corruption caused by a failure when a failure which has occurred in the active computer may corrupt the data, and for allowing the protected data to be taken over by the stand-by computer system.

In a primary aspect of the present invention, when a failure occurs in the active computer system, the disk drive device containing shared VOLs is instructed to perform a pair split of the paired VOLs, to separate the secondary vol from the primary vol. The process from the occurrence of the failure to the notification to the disk drive may be controlled either by the stand-by system monitoring the active system to direct the disk drive device from the stand-by system in case of an anomaly, or by the active system autonomically detecting an anomaly based on the error rate, memory usage and so on to direct the disk drive device by itself, or by a central administration using a dedicated monitor computer system.

The stand-by computer system uses the secondary VOL to take over the process in progress in the active computer system. For example, in a high availability database system built with active and stand-by computer systems, VOL replication is applied to the data and log areas accessed by the database system.

As an example, a cluster program monitors the heartbeats between the active and the stand-by computer systems. The stand-by computer system (or monitoring computer system), once it has detected a failure in the active computer system, directs the disk drive device to dissolve the pair configuration of data and log areas by the VOL replication and to split the secondary VOL from the primary VOL. The stand-by computer system uses the data and log areas in the secondary VOL thus split to take over the process of the active computer system experiencing the failure to complete the failover.

By doing this, a failover with data protected from the corruption caused by the active computer system at and after the moment of failover can be achieved.

More specifically, an example of pair split involves an operation of substitution of the volume identification number of the secondary VOL, which is common with the primary VOL, with a unique volume identification number, and an operation of notification of the unique volume identification number of the secondary VOL to the stand-by computer system. An embodiment of the present invention dissolves the paired configuration for the data area at the first time there is detection of the occurrence of a failure in the active computer system, to separate the data area in the secondary VOL from the primary VOL. Then, the paired configuration of the log area will be dissolved to separate the log area of the secondary VOL from the primary VOL when failures is detected a given number of times (Nth) in succession, which number triggers the failover. The stand-by computer system will take over the data area at the time of occurrence of a first failure along with the log area at the time of occurrence of the nth one of successive failures. Thereafter, the stand-by computer system uses the log area to update the data area to recover the data at the time of the nth occurrence of the failure to complete the failover process. By doing this, a failover can be achieved, which is capable of taking over in the process at the time of the nth occurrence of a failure triggering the failover, when the data and log areas are not corrupted. In other words, a failover system can be achieved which may prevent data corruption after the first occurrence of a failure.

In another aspect of the present invention, when copying data from the primary VOL to a secondary VOL using vol replication, a shared disk drive device stores data temporarily in a storage area out of or in the shared disk drive device, instead of directly writing to the secondary VOL. In a preferred embodiment, upon reception of a notice from a superior server ensuring that the primary VOL data is valid, the disk drive device writes the contents saved in the storage area into the secondary VOL to flush the storage. In this manner, the contents of the secondary VOL will be synchronized with the valid contents of the primary VOL at the moment of the notice. For example, the stand-by computer system monitors the operating status of the active computer system by monitoring the heart beat thereof with the cluster program, and when the active computer system is properly operating, then the stand-by computer system notifies the shared disk drive device of the valid status of the data. Upon reception of this status indication, the disk drive device writes down the saved contents of the temporary storage area to the secondary VOL at the time of volume replication. This allows a paired configuration in synchronization with the heart beat interval $\Delta T$ of the cluster program with the contents of primary and secondary VOLs being matched. If the heart beat monitor detects an error, the contents of the primary VOL will not be written into the secondary VOL, so that the contents of the secondary VOL contains the contents of the primary VOL at the moment it is verified that the active computer system is operating properly by the heart beat monitoring, that is, immediately before the error.

In still another aspect of the present invention, the shared disk drive device monitors the access to the VOL area when the access pattern to the VOL area on the disk is provided. When an access violation is detected which does not conform to the access pattern, the shared disk drive device is denied any accesses to the disk including and following the violating access. At the same time, the disk drive device notifies the superior server of an error to inform the server of an occurrence of access violation. For example, in a database system having the data and log areas on a disk drive device shared by the active and stand-by computer systems, the shared disk drive device is notified of the access pattern that the active computer system sequentially writes into the log area. In a case in which a random write to the log area is performed from the superior computer, which may cause corruption of data, the disk drive device may detect the write operation and deny the write operation and following accesses. At the same time, the access violation is communicated to the active computer system and the stand-by computer system. The stand-by computer system, upon reception of such an error notification, may detect the occurrence of a failure that may cause data corruption in the active computer system. In such a manner, the stand-by computer system dissolves the paired configuration of the log area having the above access violation to protect the log area in the secondary VOL at the time just before the data corruption. In addition, the contents of the log area thus protected are merged to the data area generated by a well-known snapshot technology to recover the data area immediately before the occurrence of data corruption to pass the operation of any tasks immediately before the data corruption to the stand-by computer system.

In order to achieve such a system, it can be conceivable that the disk drive device connected to a computer may incorporate an interface for registering to the disk drive device the access control pattern for allowing access from the computer to the disk drive device, a function for denying access to the disk drive device when the access from the computer to the disk does not conform to the access pattern, and an interface for indicating to an external computer system that an access violation to the access control pattern has occurred. The access control pattern may include a sequential write to prevent the data corruption which results from a random write operation.

Additional aspects and advantages of the invention will be set forth, in part, in the description that follows and, in part, will be obvious from the description.

The present invention thus provides a high availability database system, which, when a failure accompanying data corruption occurs in the active computer system, protects the data from the failure to recover the valid data prior to the data destruction and to achieve a failover using the data.

BRIEF DESCRIPTION OF THE DRAWINGS

The accompanying drawings illustrate an embodiment of the invention and, together with the description, serve to explain the objects, advantages and principles of the invention. In the drawings.

DETAILED DESCRIPTION OF THE PREFERRED EMBODIMENTS

It should be appreciated that the drawings and description of the present invention is simplified, for the sake of clarity, to indicate appropriate elements for clear understanding of the invention, and some known elements which are not essential for the practice of the invention are omitted. It is also to be understood that there are many known preferable and/or essential technologies for the implementation of the present invention, however they involve elements that are well known and do not assist in providing an understanding of the invention and therefore are not described in greater detail herein.

A detailed description of some preferred embodiments embodying the present invention will be given with reference to the accompanying drawings.

Figure 1:
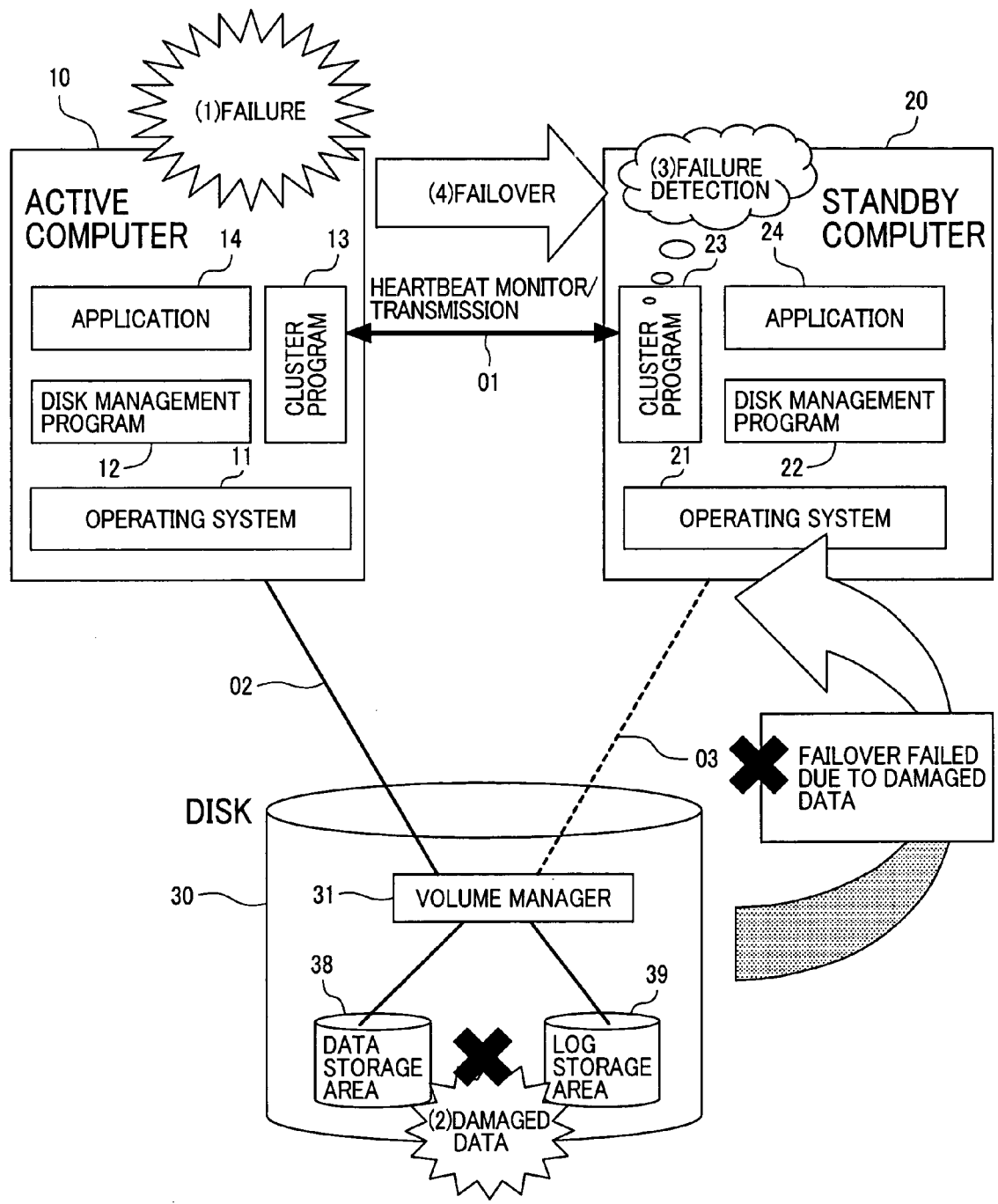
FIG. 1 is a schematic block diagram of a high order system illustrating a known problem in an active and stand-by computer system model.

FIG. 1 is a schematic block diagram which illustrates the problem to be solved by the present invention in a superior system of a known active/stand-by computer system model.

Although FIG. 1 and the description that follows depicts an application to a database for the sake of clarity, it is not intended to limit the type and operation of the present invention.

In FIG. 1, a high availability computer system includes an active server 10, a stand-by server 20, and a disk 30 shared by these servers. Each of the active/stand-by servers includes an OS (operating systems) 11, 21, a disk management program 12, 22 for managing the disk 30, an application 14, 24, a cluster program 13, 23 for monitoring the failure of the other server by monitoring (01) the heartbeat (HB) thereof. The disk drive device is connected to the active/stand-by servers through paths 02 and 03, and it includes the volumes (VOL) 38, 39 used by the application and the volume manager 31 for managing VOLs on the disk. In the following description, a database is used as the exemplary embodiment in which the VOL is composed of a data area 38 and a log area 39.

The cluster program 13, 23 uses the HB monitor 01 to detect a failure by the stand-by server ((3) in the figure) when a failure occurs in the active server 10 ((1) in the drawing), and to take over the process (failover) in the active server (failover) ((2) in the drawing). The failover performed by the cluster program is executed only when there are several failures detected repeatedly in order to prevent the failover from being performed due to a temporary error or a false detection. Therefore, there is a time lag from the first detection of a failure to the actual failover. If the failure (1) that has occurred in the active computer system involves a corruption (2) of the data to be taken over to the backup system, caused by a bug or a runaway of the application, the corrupted data will be taken over. This causes a problem in that the stand-by computer system cannot take over the process with respect to the data in question.

Figure 2:
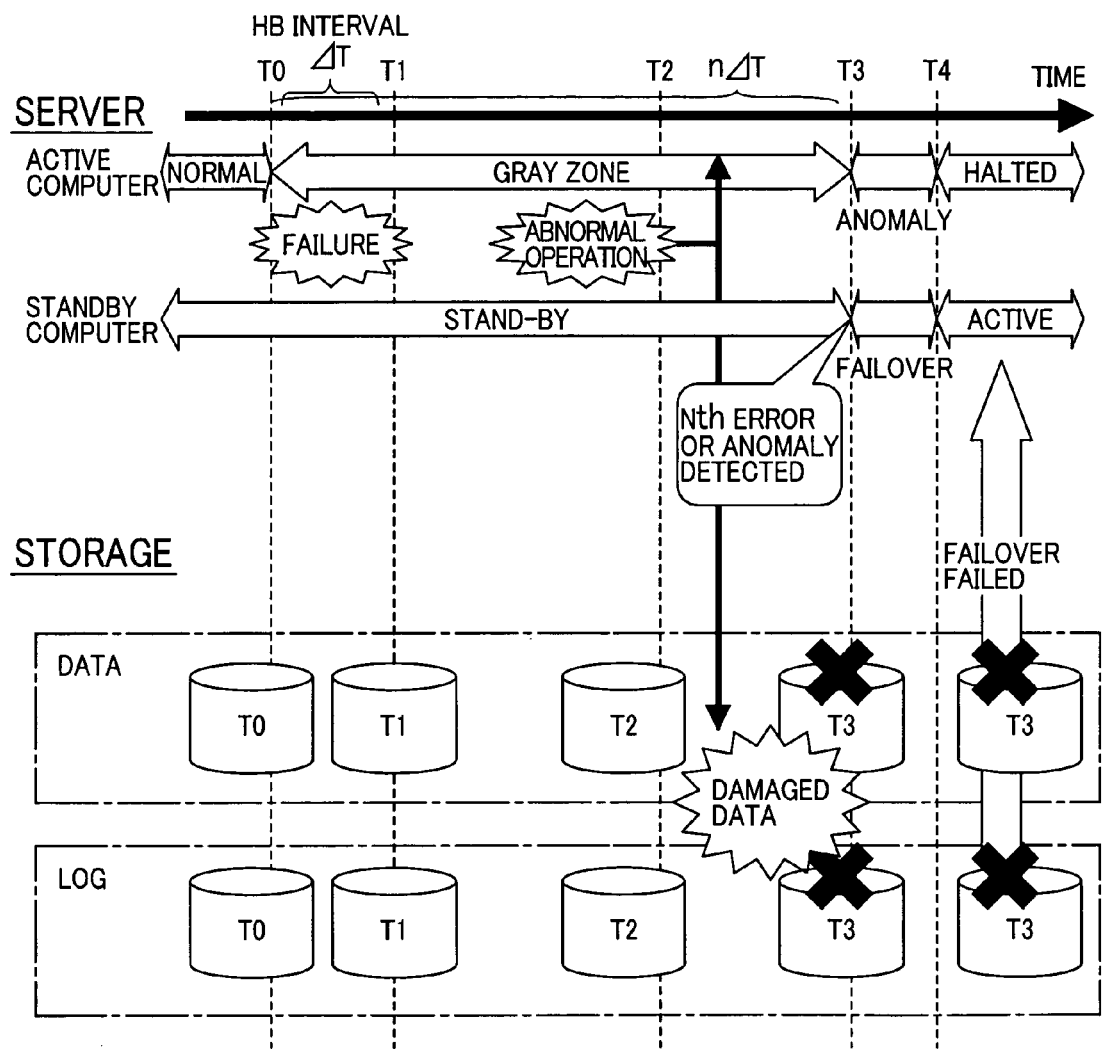
FIG. 2 is a process timing diagram illustrating the known problem in the active and stand-by computer system model of FIG. 1.

FIG. 2 shows a time flow diagram indicative of the problem shown in FIG. 1. In FIGS. 2, 5, 7, 11 and 12 similar members are designated to by similar reference numbers, and a description thereof will not be repeated.

In FIG. 2, the abscissa represents time and the ordinate represents the status of active/stand-by servers and the data status on the storage shared by these servers. The data on the storage includes a data area and a log area for the database. Timings T0, T1, T3 are the time points where the superior server of the disk drive device ensures the data, in other words, the moments at which the HB is monitored, and the interval $\Delta T$ ($=T1-T0$) indicates the time span between two HBs. From the time T0 to T1, a failure occurs in the active server, and, at the time T1, the failure is detected for the first time by the stand-by server. The time T3 indicates the time point where the failure is detected continuously n times at and after the time T1, and, in this example, the time T3 is indicated as T1+n $\Delta T$, since the number of successive failures that the cluster program requires to determine the need for failover is n. The cluster program executes the failover at the time T3. It is assumed that data corruption may occur at any given moment between the time T0 and T3, as a result of the failure which arose at the time T0–T1. The time T2 indicates a given time point where the data in the time span T1–T3 is still valid. In other words, the data corruption occurs somewhere between the time T2 and T3. The time T4 is the time point where the failover has been completed and that the stand-by server has taken over the process of the active server. The time in which the cluster program determines that a failure with the corruption of disk contents in the active server has occurred is between T0 and T3.

In FIG. 2, a case is shown in which a serious failure has occurred between the time T2 and the time T3, thereby to destroy the data and log, and so the data or log at the time T3 is corrupted. This indicates that the data and log having the corrupted contents is passed to the stand-by server, so that the operation after the failover, subsequent to the time T4, is not assured and the failover may cause the system to go down.

Figure 3:
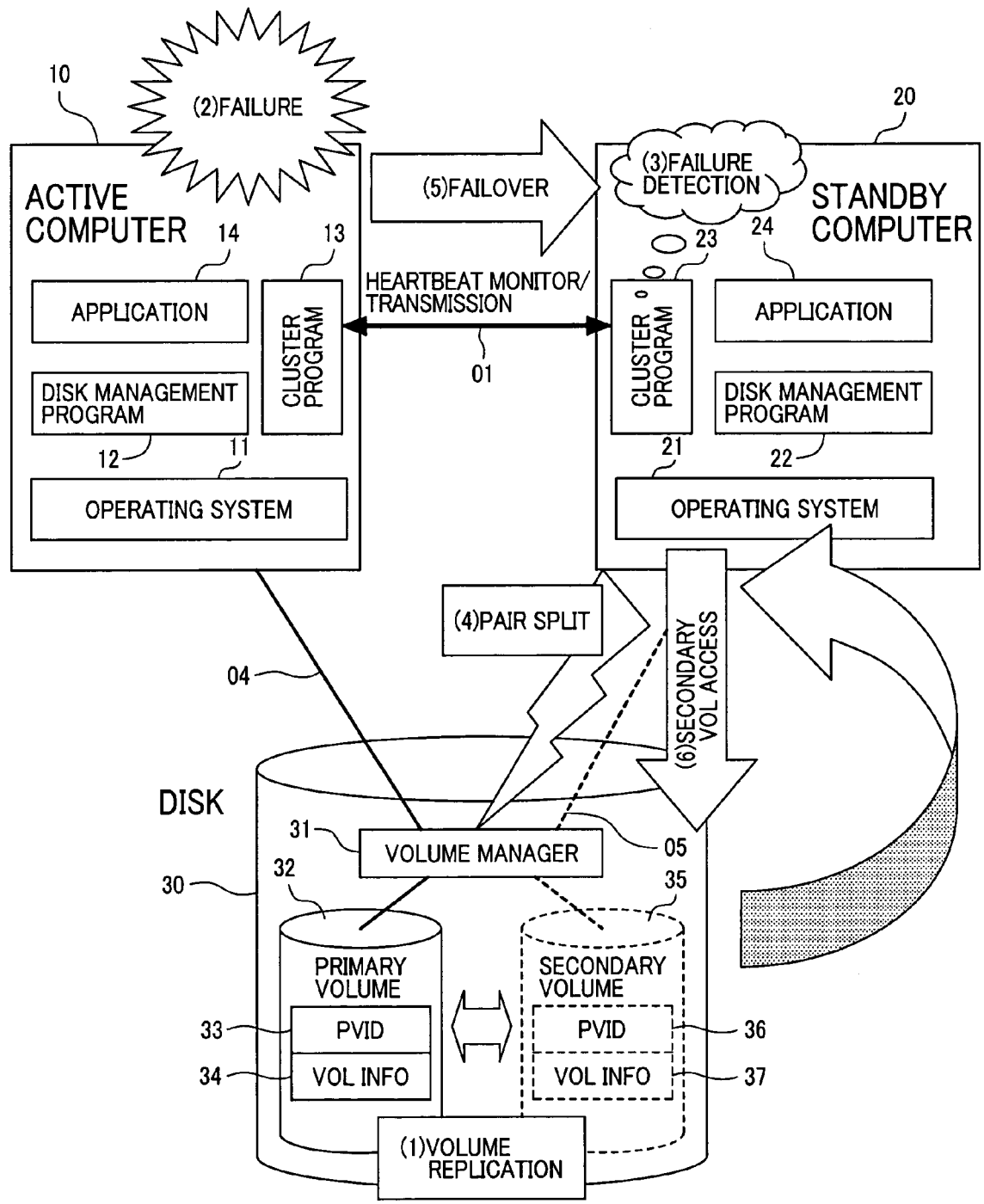
FIG. 3 is a schematic block diagram of a high order system in a computer system model in accordance with the first preferred embodiment of the present invention.

FIG. 3 is a schematic block diagram indicative of a superior system with ctive and stand-by computer systems in accordance with a first preferred embodiment of the present invention. The disk 30 has a VOL replication function, and it includes a pair of target volumes, namely a primary VOL 32 and a secondary VOL 35. The primary/secondary VOLs include their respective PVID 33, 36, and VOL information 34, 37. The VOL replication ((1) in the figure) is applied to the VOL containing data used by the application 14 of the active server 10, and it is used to build a pair of VOLs consisting of a primary VOL and a secondary VOL. When a failure has occurred in the active server 10 ((2) in the figure), the cluster program 23 on the stand-by server 20 detects the onset of failure using the HB monitor 01 ((3) in the figure). The cluster program 23, upon detection of a failure, directs the volume manager 31 on the disk to split the pair ((4) in the figure) to separate the secondary VOL 35 that was paired with the primary VOL 32 until the moment immediately prior to the failure. The pair separation procedure involves changing the PVID 36 of the secondary VOL 33, and writing back information of the PVID 36 and VOL information 37 of the secondary VOL. The pair split allows protecting the data on the secondary VOL 35 from being altered and maintaining data as is at the time of failover, even if the active server continues to corrupt the data contained in the primary VOL 32 due to the failure after the occurrence of the failure. When the pair split is completed, the cluster program 23 executes the failover procedure ((5) in the figure) to effect access to the secondary VOL 33, which has been pair separated ((6) in the figure), thereby to terminate the failover procedure. In this manner, a failover is achieved while protecting the secondary VOL 35 against the corruption of data on the primary VOL 32 after the failover.

In the example shown in FIG. 3, the cluster programs 13, 23 of the active/stand-by servers 10, 20 are configured to each monitor the other server to detect a failure. Other arrangements are equally implementable; such as, for example, each server may dispersively and autonomously monitor itself and detect a failure. In addition, a server dedicated to the monitoring may be provided to perform centralized management of the server status.

Figure 4:
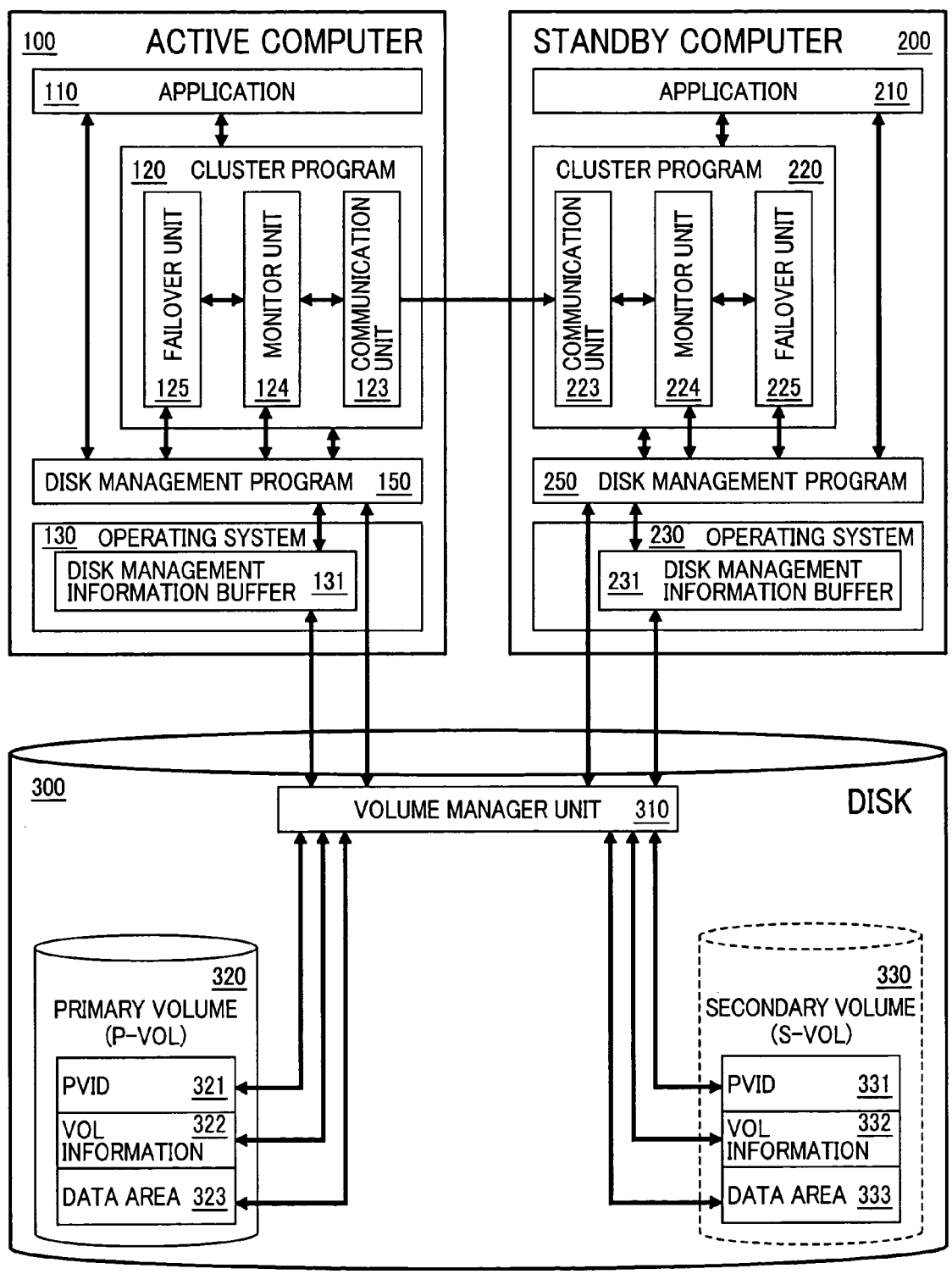
FIG. 4 is a schematic block diagram of a lower order system in computer system model in accordance with the first preferred embodiment of the present invention.

FIG. 4 is a schematic block diagram of the lower order of a computer system in accordance with the first preferred embodiment of the present invention shown in FIG. 3.

In FIG. 4, for the sake of clarity of the description, three digits numbers are used for the label of programs. For the same program on the active computer system and stand-by computer system, the numbers are the same in the lower two digits; for the most significant, digit 1 is for the active computer system and digit 2 is for the stand-by computer system. In the following description, the programs will be described a priori. In the following description, program reference numbers are cited for the active computer system, and the description is similar for the program on the stand-by computer system. In the drawings that follow, a similar number is used for a similar member used in the description of FIG. 4 unless otherwise specified.

A disk 300 contains a volume manager 310, a primary VOL 320 and a secondary VOL 330 subject to VOL replication. The primary VOL/secondary VOL (320, 330) include PVID (321, 331) used for the identification of the VOL and VOL information (332, 333) used for access to the VOL. The volume manager 310 has a functionality of performing a VOL replication to change the PVID (321, 331) and VOL information (332, 333) of the primary VOL 320 and secondary VOL 330. The active computer system 100 contains an OS 130, a cluster program 120, a disk management program 150, and an application 110.

The OS 130 includes a disk management information buffer 131. The OS 130 also intermediates the access from the disk management program 150 to the disk 300. In this access, access results may be saved in the disk management information buffer 131, or the information saved in the disk management information buffer 131 is used instead to effect access to the disk 300.

The disk management program 150 includes programs running on the active computer system 100 for access to the disk 300, for example, a lock control program for the VOL, a program for retrieving PVID and VOL information of a VOL, and a program for performing a VOL replication. When executing those programs, the volume manager 310 may be indicated, and the disk management information buffer 131 may be read out. The program for performing a VOL replication may use a definition file 160 for the VOL replication.

The cluster program 120 includes a communication unit 123 for performing communication with other systems, a monitoring unit 124 for monitoring the status of itself and other systems, and a failover unit 125 for performing a process of failover.

The monitoring unit 124 includes a function of detecting a failure in its autologous system by monitoring the application 110, a function of communicating with the communication unit 223 of the cluster program 220 of the stand-by computer system through the failover unit 125 to indicate its own status, and a function of detecting a failure on another system.

The failover unit 125 has a function of performing a failover between the active and backup systems according to a failure detection on the one and the other as communicated from the monitoring unit 124. The failover unit 125 also includes a function of controlling the execution of VOL replication through the disk management program 150 according to the detected results of VOL replication execution provided by the monitoring unit 124 on the one and the other system, a function of retaining the status in a VOL replication status flag and a VOL replication status file, and a function of notifying the application 110 that uses the VOL replication of the availability of the secondary VOL to suspend and resume the use.

When a failure occurs in the active computer system 100, the monitoring unit 124 and 224 of the cluster program 120 and 220 detects the failure. The monitoring unit 224 that has detected a failure notifies the failover unit 225. The failover unit 225 directs the volume manager 310 to perform a pair split through the disk management program 250. The volume manager 310 upon reception of this notice, in turn, assigns a new value to the PVID 331 of the secondary VOL 330, which is different from the value used in the PVID 321 of the primary VOL 320, to separate the secondary VOL 330 from the primary VOL 320. The disk management program 250 stores the assigned PVID 331 of the secondary VOL 330 into the disk management information buffer 231. By doing this, the stand-by computer system 200 has access to the secondary VOL 330 that is separated from the pair status. The pair split as described above allows the data area 333 on the secondary VOL 330 to maintain the contents of the data area 323 of the primary VOL 320 at the moment of failure occurrence. After the pair split, the failover unit 225 of the stand-by computer system 200 directs the application 210 to use the secondary VOL 330 to take over the process in progress on the active computer system 100 that has experienced a failure. In such a manner, the data contents at the time of failover are protected and a failover is completed while the process can be failsafe.

In the active and backup computer system having means as described above, data protection and failover can be achieved against the destruction of data and log areas since the time T3 in FIG. 2.

Figure 5:
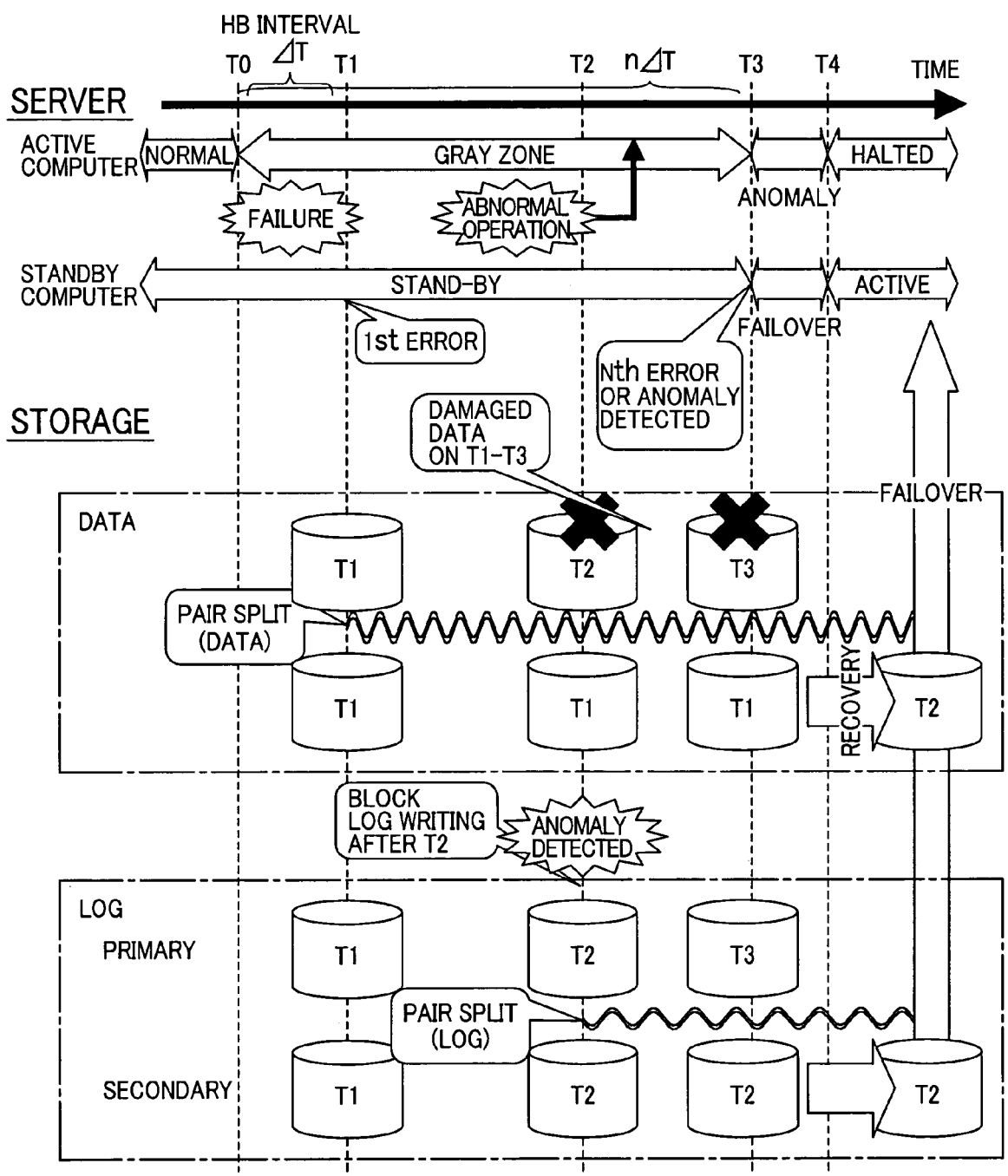
FIG. 5 is a process timing diagram of the disk drive device in accordance with the second preferred embodiment of the present invention.

FIG. 5 shows a timing chart of failure detection and data protection using a pair split by VOL replication in accordance with a second preferred embodiment of the present invention. In the second preferred embodiment, there is provided a means for preventing the destruction of the data area from the time T1 to T3 in FIG. 2.

At the time T1, first detection of the occurrence of a failure, the data area has a pair split performed so as to protect the data area. The data area can be protected in this way when a failure occurs on the active computer system which may destroy the data after the time T1. Since the occurrence of the corruption of the data area may not be anticipated, the secondary VOL is isolated from any proper writing to the data area, thus, there will be some hiatus of data if the secondary VOL is used for the failover to take over the process, and this may cause a system failure. Then, the log area in which the update history of the data area is recorded is held to be paired at the time T1, without splitting. The log area will have a pair split performed at the time T3 where a failover has taken effect. In such a manner, the log at the time T3 can be protected against destruction of the log area after the time T3. By using the log area thus split, the data area protected at the time T1 can be updated to recover the data area up to the time T2 between the time T1 and the time T3, where the data in the data area and log area is valid. Since the log area includes data up to the time T3, the log area status at the time T2 is recoverable. As can be seen from the foregoing, the data area and log area at the time T2 is taken over to the stand-by computer system, so that the stand-by computer system can resume operations from the status at the time T2, in the time T4 when the failover is completed.

The second preferred embodiment having means as described above makes it possible to protect data and achieve a failover against corruption of the data area after the time T1 and corruption of the log area after the time T3 of FIG. 2.

Figure 6:
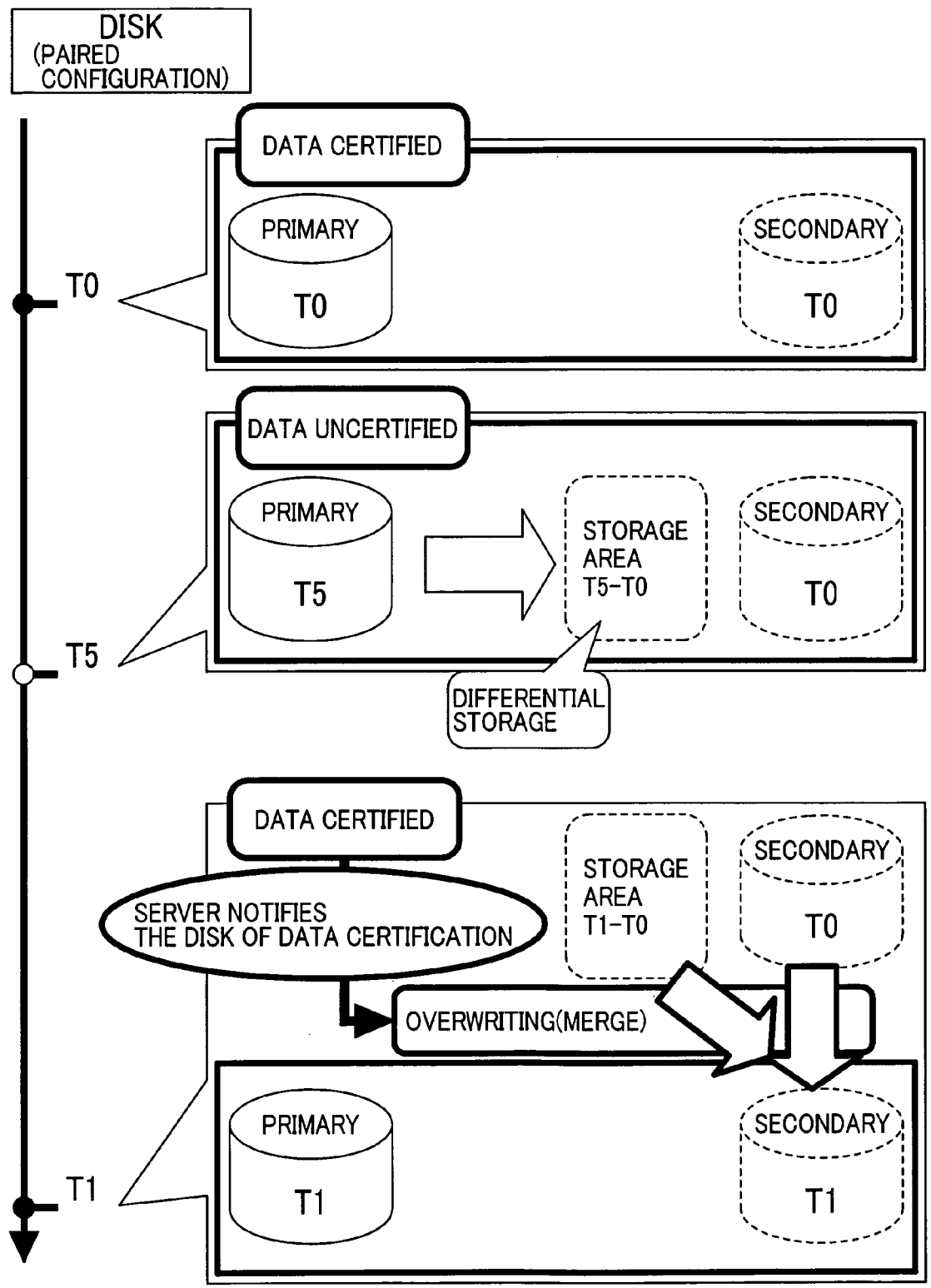
FIG. 6 is a schematic block diagram of a lower order computer system in accordance with a third preferred embodiment of the present invention.

FIG. 6 is a schematic diagram illustrating a disk process for data protection at the time of pair split of the VOL replication in accordance with a third preferred embodiment of the present invention. In the figure, the elapsed time is represented on the ordinate on the left hand side of the figure, and a process flow of the data protection by the VOL replication performed within the disk drive device is represented on the right hand side of the figure. Times T0 and T1 indicate the time points where the superior server of the disk drive device ensures the data, and time interval $\Delta T$ (=T1−T0) indicates the interval during which the data is certified. The time T5 indicates an arbitrary time between the time T0 and the time T1.

The entire process flow will now be described. At the time T0, the server directing the VOL replication certifies the data, thus both the primary VOL and the secondary VOL contain proper data at the time T0. At the time T5, which is prior to the time T1 of the next data certification from the server, the validity of the data updated since the time T0 up to the time T5 is not certified. The data on the primary VOL updated until the time T5 therefore is accumulated in the buffer as the difference of the update from the time T0 to the time T5, instead of directly overwriting it on the secondary VOL by VOL replication, so as to keep the data at the time T0 on the secondary VOL. At the time T1, the buffer holds the update data from the time T0 to the time T1 and the secondary VOL holds the data at the time T0. Once the server notifies the disk drive device of the assured validity of data (data certicication), the update data from the time T0 to the time T1, that is held in the buffer, is overwritten onto the data of the time T0 held in the secondary VOL. Thereafter, the buffer is flushed and the secondary VOL holds the data at the time T1. At the time T5, a means for reading out the data on the secondary VOL includes a function of reading out the data of the secondary VOL maintaining the contents at the time T0, and a function of reading out the data at the time T5, which is identical to the data on the primary VOL, by applying the update contents of T5−T0 in the storage area to the data on the secondary VOL.

The interval $\Delta T$ of data certification is defined by the times T0 and T1 of data assurance, however it can be determined from the interface having the interval $\Delta T$ provided from the superior server.

The third preferred embodiment of the present invention, having the means as described above, may achieve a paired configuration at the time (T0, T1) of data assurance by the server. In addition, the data at the time (T5) between two data verification times T0 and T1 is not directly written, so that the data at the time (T5) and the data verified at the time (T0) may be both read out.

Figure 7:
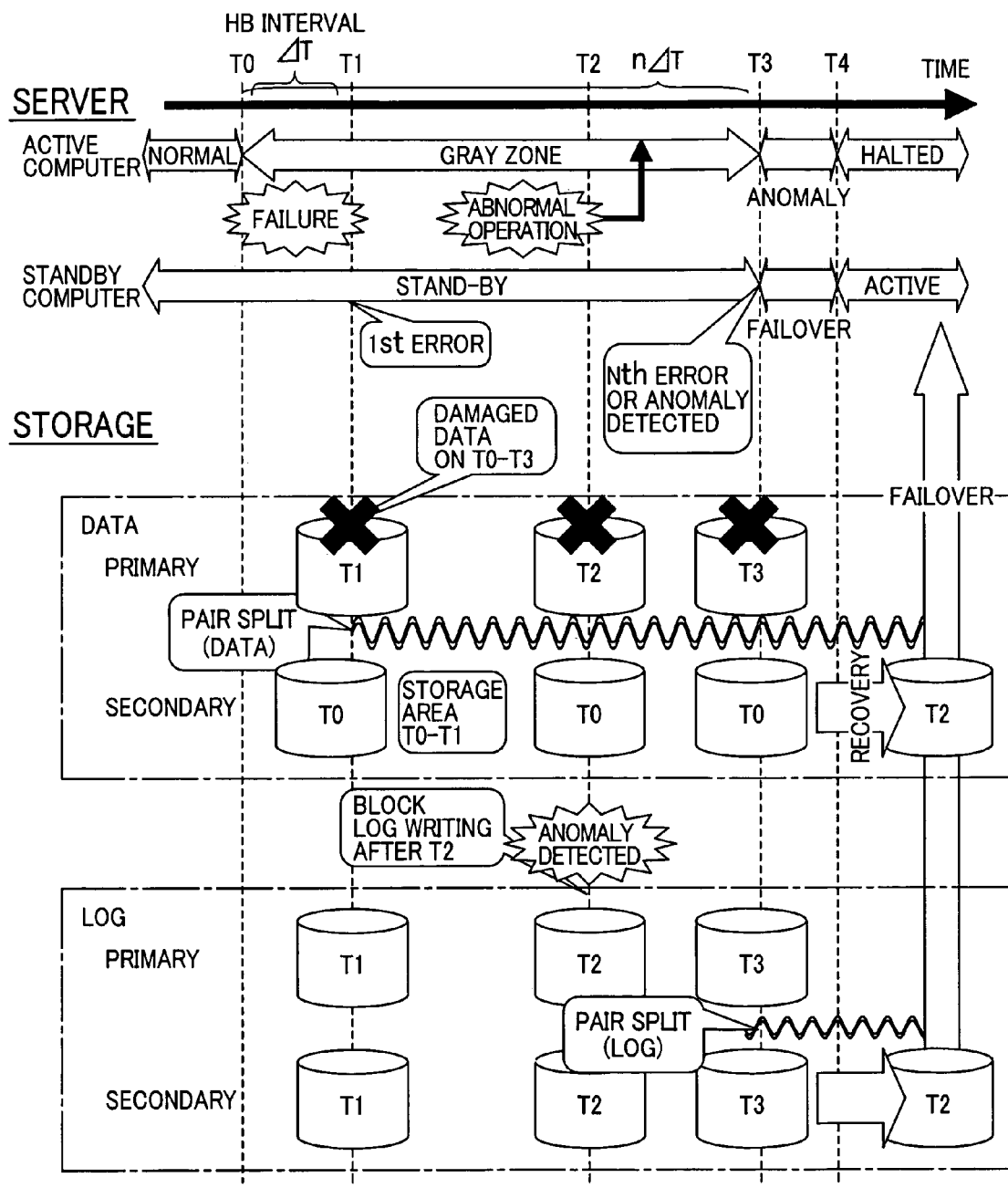
FIG. 7 is a process timing diagram illustrating the data protection against corruption that is achieved in accordance with a fourth preferred embodiment of the present invention.

FIG. 7 shows a lower order schematic block diagram of a computer system in accordance with a fourth preferred embodiment of the present invention. This embodiment uses the disk of the third preferred embodiment shown in FIG. 6. In the figure, in order to facilitate the understanding of a seventh preferred embodiment to which the fourth preferred embodiment is applied, a block diagram similar to the lower order block diagram shown in FIG. 2 is used and some description is added, however this is not intend to limit the fourth preferred embodiment. In the figure although the third preferred embodiment is applied only to the data area, this may also be equally applied to the log area.

In FIG. 7, the data verification time in FIG. 6 corresponds to the time that the active computer system is formed to be properly operating by means of the heartbeat. In other words, the stand-by computer system uses the heartbeat to determine that there is proper operation of the active computer system, and notifies the disk of the presence of valid data in the data area. By doing this, at the time T0, the data is verified and assured so that the data in the primary VOL and the data in the secondary VOL is in synchronization at the time T0. At the next heartbeat time T1, the secondary VOL contains the data area with the contents at the immediately prior time T0 where the active computer system has been verified to be valid by means of the heartbeat, and the storage area containing the data that corresponds to the data in the primary VOL that has been updated since the time T0 up to the time T1. When the stand-by computer system determines that the active computer system has experienced a failure, as shown in the figure at this time, it does not communicate a verified data assurance, so that the secondary VOL on the disk contains the secondary VOL having the data stored in the data area at the time T0 and the storage area having the data updated since the time T0 up to the time T1 in accordance with the update of the primary VOL.

The fourth preferred embodiment of the present invention, having the means as described above, allows a paired configuration by means of the VOL replication of the data when the heartbeat is normal, indicating the active computer system is properly operating, by effecting correspondence of the data verification time in FIG. 6 to the heartbeat interval in the active and stand-by computer systems.

The following description is directed to a seventh preferred embodiment of the present invention. The second preferred embodiment is applied as shown in FIG. 5. By doing this, the data area is pair split at the time T1, so that the contents of the data area at the time T0 are protected. The log area on the other hand is split from the pair at the time T3 when the failover is performed, and the contents of the log area at the time T3 are protected. By making use of the data, the data area and log area at an arbitrary time T2 after the time T0 and prior to the time T3 can be recovered so as to allow the failover to take effect. In other words, data protection and failover are achieved against the destruction of the data area after the time T0 and the destruction of the log area after the time T3.

Figure 8:
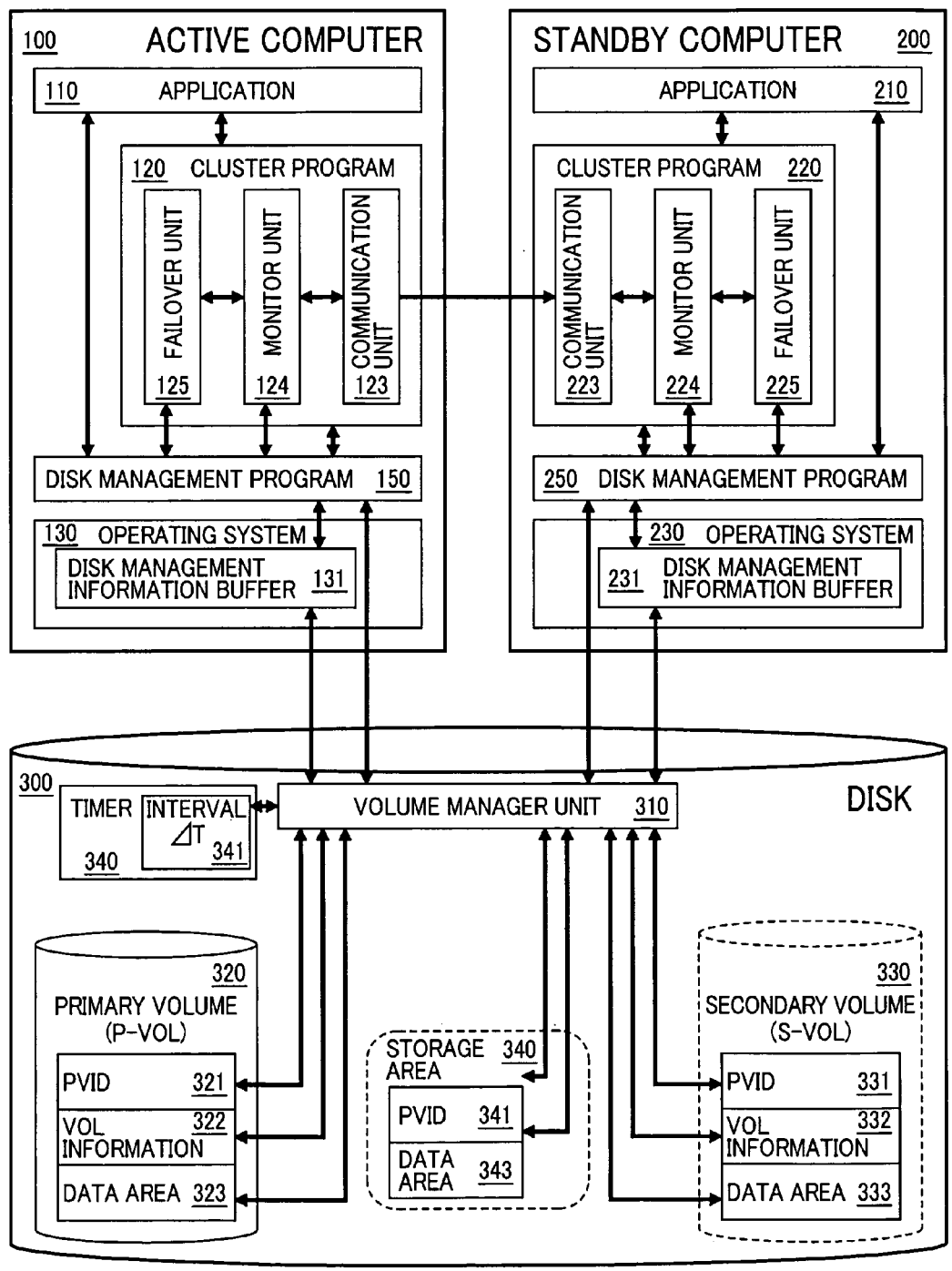
FIG. 8 is a schematic block diagram of a lower order computer system in accordance with the fourth preferred embodiment of the present invention.

FIG. 8 shows a lower order schematic block diagram of a computer system in accordance with the fourth preferred embodiment of the present invention shown in FIG. 6 and FIG. 7. In the following, the fourth preferred embodiment shown in FIG. 7 will be described in greater detail in order to facilitate an understanding of the superior server, however the process within the disk drive device is implemented similarly to the third preferred embodiment shown in FIG. 6.

The disk 300 has a storage area 340 for temporary saving of the update data of the primary VOL for the next data certication. The storage area 340 has a PVID 341 indicating to which secondary VOL this storage area belongs, and a data area 343 for storing the update data. The volume manager 310 has, in response to the request from the disk management program 150 and 250 on the superior server, the active computer system and stand-by computer system, a function of reading out the PVID 331, VOL information 332 and data area 333, as was done in the preceding embodiments, and additionally a function of providing the data contents such that the data area 333 of the secondary VOL is updated by the data area 343 in the storage area 340 for the disk management programs 150 and 250 without overwriting by the data area 333 of the secondary VOL. The volume manager 310 has a function of updating the data area 333 with the contents of the data area 343 in the storage area 340, upon reception of the notice of the assurance of verified data for overwriting the data area 333, and a function of flushing the contents of the data area 343 after the overwriting.

The monitoring unit 224 of the cluster program 220 in the stand-by computer system 200, upon detection of a valid active computer system, indicates to the volume manager 310 through the disk management program 250 that the data is valid. The volume manager 310 will update the data area 333 with the contents of the data area 343 of the storage area 340 to overwrite the data area 333 and will flush the contents of the data area 343 after the overwriting is complete. When the active computer system is detected to be valid by the monitoring unit 224 of the cluster program 220, the contents of the data area 333 of the secondary VOL is ensured to be matched with the contents of the data area 323 on the primary VOL 320. The fourth preferred embodiment of the present invention is achieved thereby.

The disk 300 also contains a timer 340, which timer 340 has an area 341 for storing the timer clock. The volume manager 310 stores into the area 341 the interval ΔT when the interval ΔT is specified by the disk management programs 150 and 250. The timer 340 has a function of updating the data area 333 with the contents of the data area 343 in the storage area 340 for every interval ΔT, stored in the area 341, and a function of flushing the contents of the data area 343 after the overwriting is complete. This makes it possible to arbitrarily set the interval ΔT, while for every given and arbitrary interval ΔT the data area 333 on the secondary VOL is ensured to be identical to the contents of the data area 323 in the primary VOL 320.

As can be seen from the foregoing, the fourth preferred embodiment may protect against the corruption of data in the data area at the time period T0 to T3 in FIG. 2.

Figure 9:
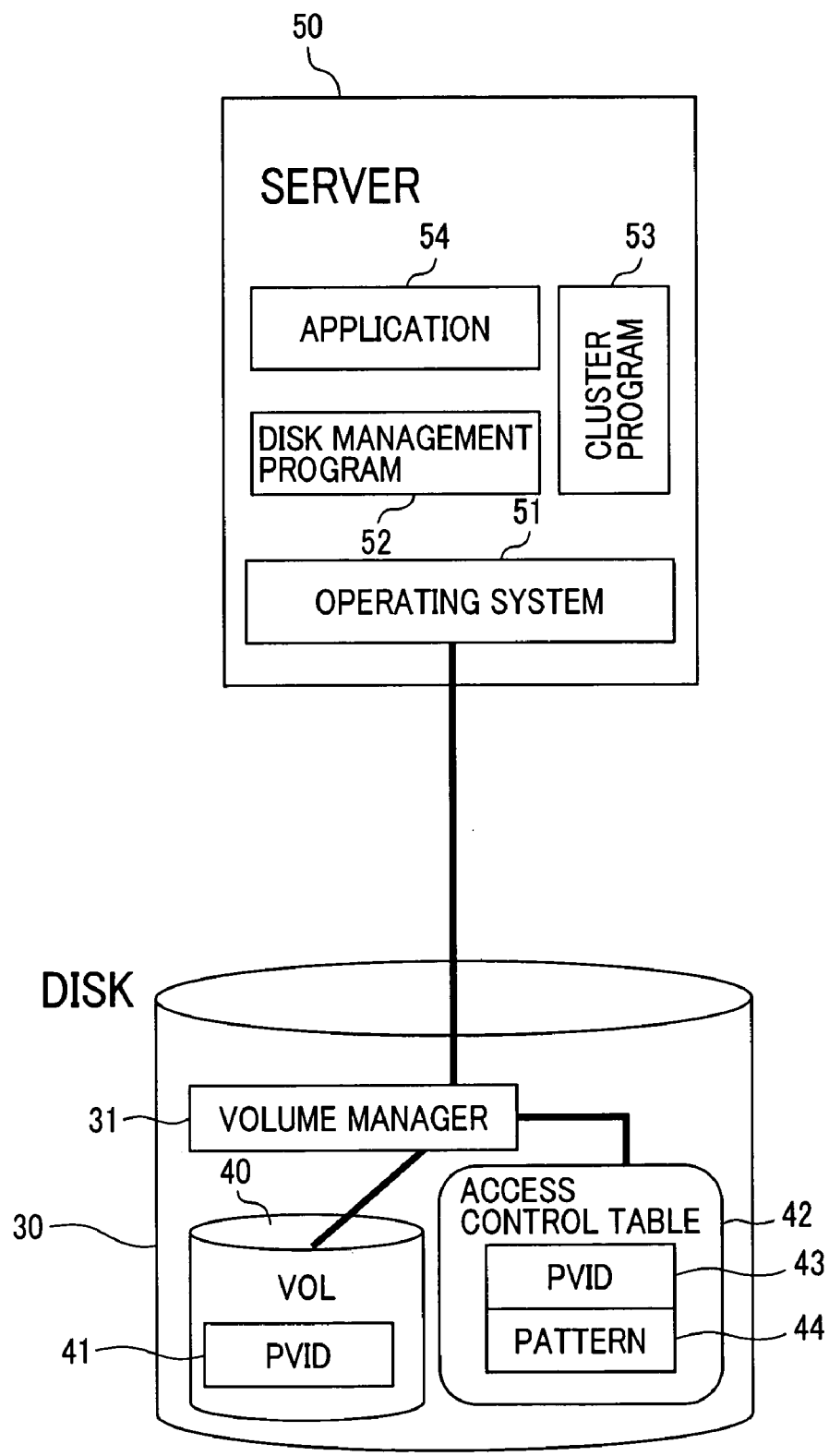
FIG. 9 is a schematic block diagram of a higher order computer system model in accordance with a fifth preferred embodiment of the present invention.

FIG. 9 is a schematic block diagram of a superior system in the active/stand-by computer system model in accordance with the fifth preferred embodiment of the present invention. In FIG. 9, the computer system is composed of a server 50 and a disk 30. The active/stand-by servers include an OS 51, a disk management program 52 for managing the disk drive device 30, a cluster program 53 for detecting a disk failure, and an application 54. The disk drive device is connected to the active and backup servers with connections 02 and 03, and includes a VOL 40 used by the application, a volume manager 31 for managing the VOL on the disk, and an access control table 42 for access control to the VOL 40. In addition, the VOL 40 includes a PVID 41, and the access control table 42 includes the PVID 43 of the target VOL and the pattern 44 of the accesses to be controlled.

The cluster program 53 indicates the patterns of normal accesses performed on the VOL 40 used by the application 54 to the volume manager on the disk drive device through the disk management program 52. The volume manager 31 stores the thus presented patterns to the PVID 43 and the pattern 44 in the access control table 42, along with the PVID 41 of the target VOL 40.

The application 54 accesses the VOL 40 through the volume manager 31. The volume manager 31 compares the access pattern of the application 54 with the pattern 44 stored in the access control table to determine that the access to the VOL 40 is to be granted if the access is of an allowed pattern. If the pattern of the access is not allowed, the access to the VOL 40 is denied and the volume manager 31 returns an error to the accessing application 54 through the disk management program 52. The volume manager 31 also indicates an access error to the cluster program 52. The cluster program 52 thereby may detect the occurrence of an access, which is likely to cause corruption of the VOL 40.

The fifth preferred embodiment of the present invention, incorporating the means as described above, may provide a disk drive device having a means for controlling the access to the data area on the VOL, a means for accepting the controlled pattern from the superior server, and a means for indicating to the superior server when an access from a superior server is violating the controlled access pattern.

Figure 10:
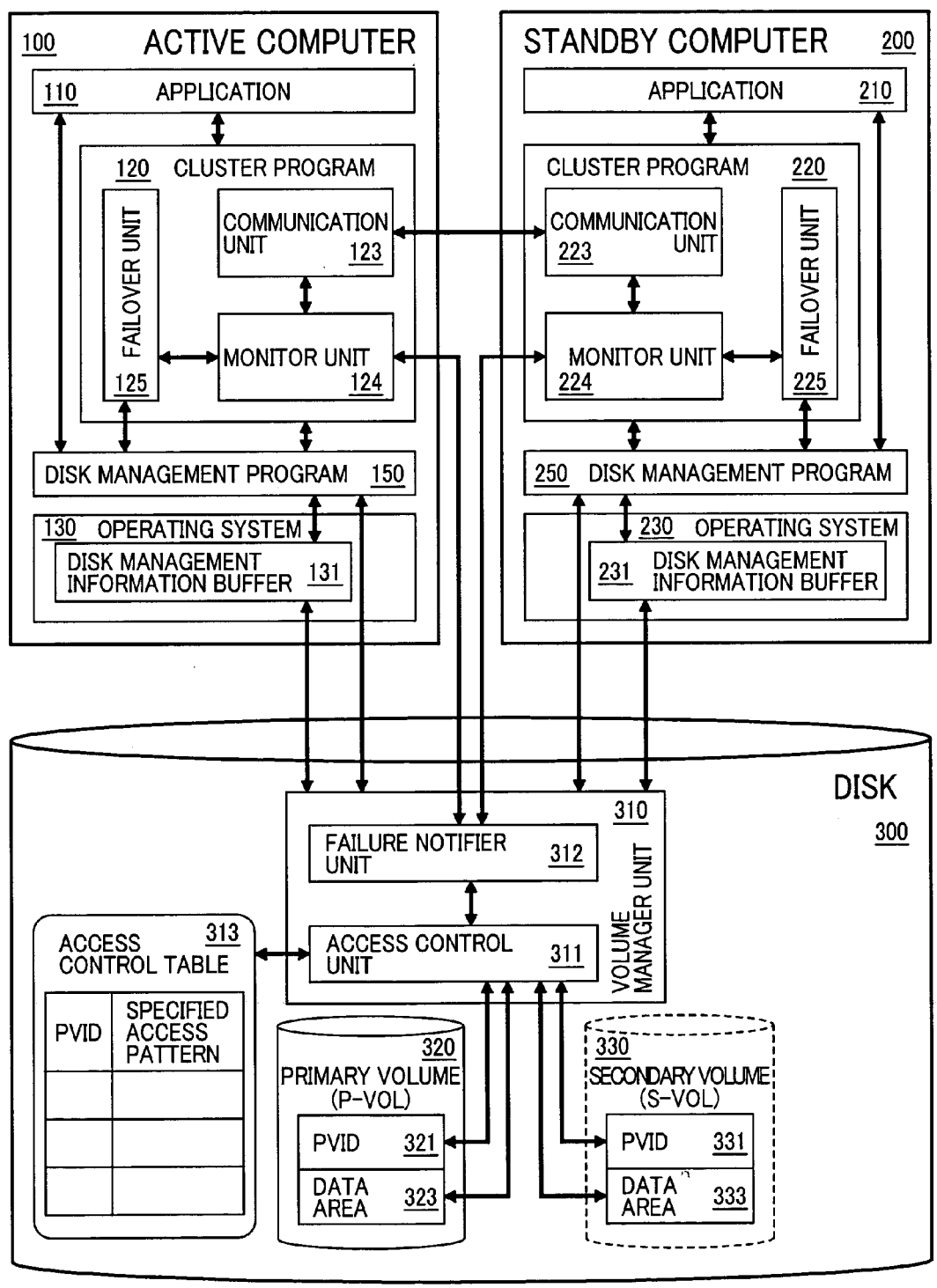
FIG. 10 is a lower order schematic block diagram of a system in a computer system model in accordance with a sixth preferred embodiment of the present invention.

FIG. 10 is a lower order schematic block diagram of a computer system in accordance with a sixth preferred embodiment of the present invention, making use of a disk that has a control capability of allowing or denying access to the VOL on the disk based on the accessing pattern according to the fifth preferred embodiment shown in FIG. 9.

The application 110 of the active computer system 100 indicates the accessing pattern to the primary VOL 320 used by the application to the volume manager 310 on the disk 300 through the disk management program 150. The accessing pattern is used for allowing or denying the access in question. This notification includes the PVID 321 of the primary VOL 320 used by the application 110. The volume manager 310, upon reception of the notification, will register and maintain the PVID 321 and the accessing pattern in the access control table 313 by using the access controller unit 311. Thereafter, access from the active computer system 100 to the primary VOL 320 is performed through the access controller unit 311 of the volume manager 310. The access controller unit 311 will compare the accessing pattern of the access in question with the access pattern 315 of the target PVID in the access control table 313, and the access to the primary VOL 320 will be granted if the patterns match. Otherwise, if the pattern does not match, the active computer system 100 will receive an access error, and a failure notifier unit 312 will be called up to notify the monitoring unit 124 and 224 of the active and backup systems of the occurrence of an unauthorized access. The access controller unit 311 will permanently deny access to the primary VOL 320 to which the unauthorized access was attempted after the occurrence of the unauthorized access.

The monitoring unit 224 sends a failover request to the monitoring unit 124 through the communication unit 225 and communication unit 123. The monitoring unit 224 determines a failover caused by an unauthorized access based on the notification of an unauthorized access and on the failover request, and it will stop the application 110. On the other hand, the monitoring unit 224, in parallel to sending a failover request, will also send a failover request to the failover unit 225. The failover unit 225 will be requested to stop the VOL replication by the volume manager 310 on the disk 300 through the disk management program 250. The volume manager 310 in turn will comply with the request to separate the secondary VOL 330 from the primary VOL 320.

At this time, the secondary VOL 330 holds the status that the primary VOL 320 attempts an unauthorized access. Then, the failover unit 225 takes over the process of the application 110 in compliance with the failover request to use the secondary VOL by the application 210 to complete the failover with the valid data status.

Figure 11:
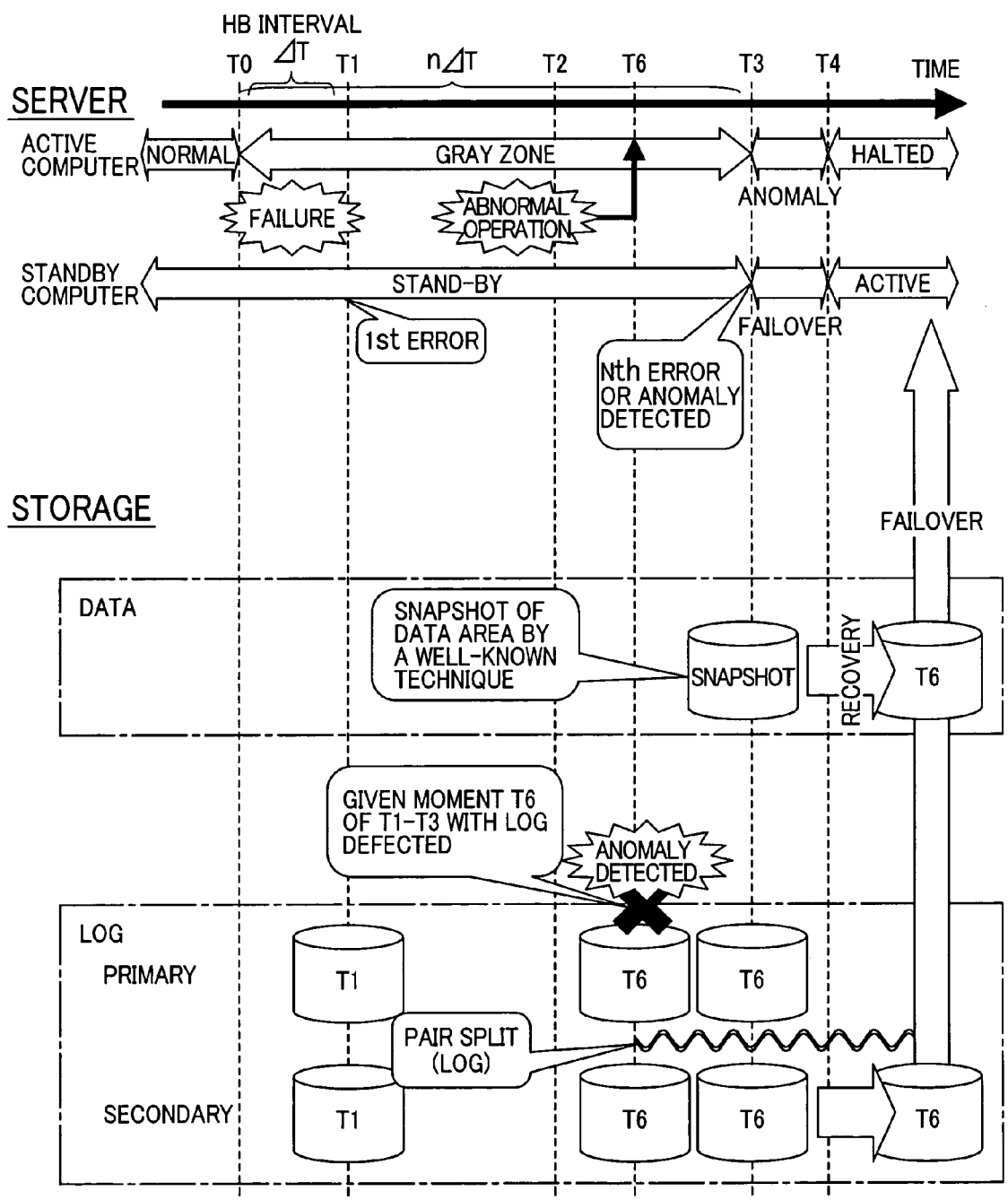
FIG. 11 is a process timing diagram illustrating the data protection against corruption that is achieved in accordance with the sixth preferred embodiment of the present invention.

FIG. 11 is a timing chart illustrating the detection of a failure and the timing of data protection by the pair split by the VOL replication in accordance with the sixth preferred embodiment of the present invention shown in FIG. 10. In the sixth preferred embodiment, the present invention provides a means for preventing corruption of the log area during the time from T0 to T3 of FIG. 2.

The time T6 is the time at which an access to the log area that risks the corruption of the log area due to the failure in the active computer system, has occurred. From this time T6, any access thereafter to the log area will be an error, and the update of the log area will be suspended. At the same time, an access violation is communicated to the stand-by computer system. The stand-by server, upon reception of the notification of access violation, will perform a pair split of the log area on the disk. The log area of the secondary VOL thereby will protect the log at the time T6, where the access violation has occurred. The snapshot of the data area according to one well-known technique can be done so that the data area at the time T6, where the data in the log area is valid, can be recovered by applying the log area holding the contents at the time T6 to the data area. Thus, the recovered data area will contain valid contents on the basis that the log area is valid.

As can be seen from the foregoing, the data area and log area at the time T6 will be taken over to the backup server, therefore, after the time T4 when the failover is complete, the status at the time T6 can be taken over.

In this description, the recovery at the time T6 has been described, however the data and log areas at a given arbitrary time up to the time T6 are recoverable, and the data status at the time where the data is valid in the range from T0 to T6, or the data status at the time T2 where the data is valid in the period from T0 to T3, can be taken over.

The sixth preferred embodiment of the present invention, having the means as described above, allows protecting data and achieving failover against corruption of the log area at the time (T6) where a failure has occurred that is likely to corrupt data in the log area in the period of time from T0 to T3.

Figure 12:
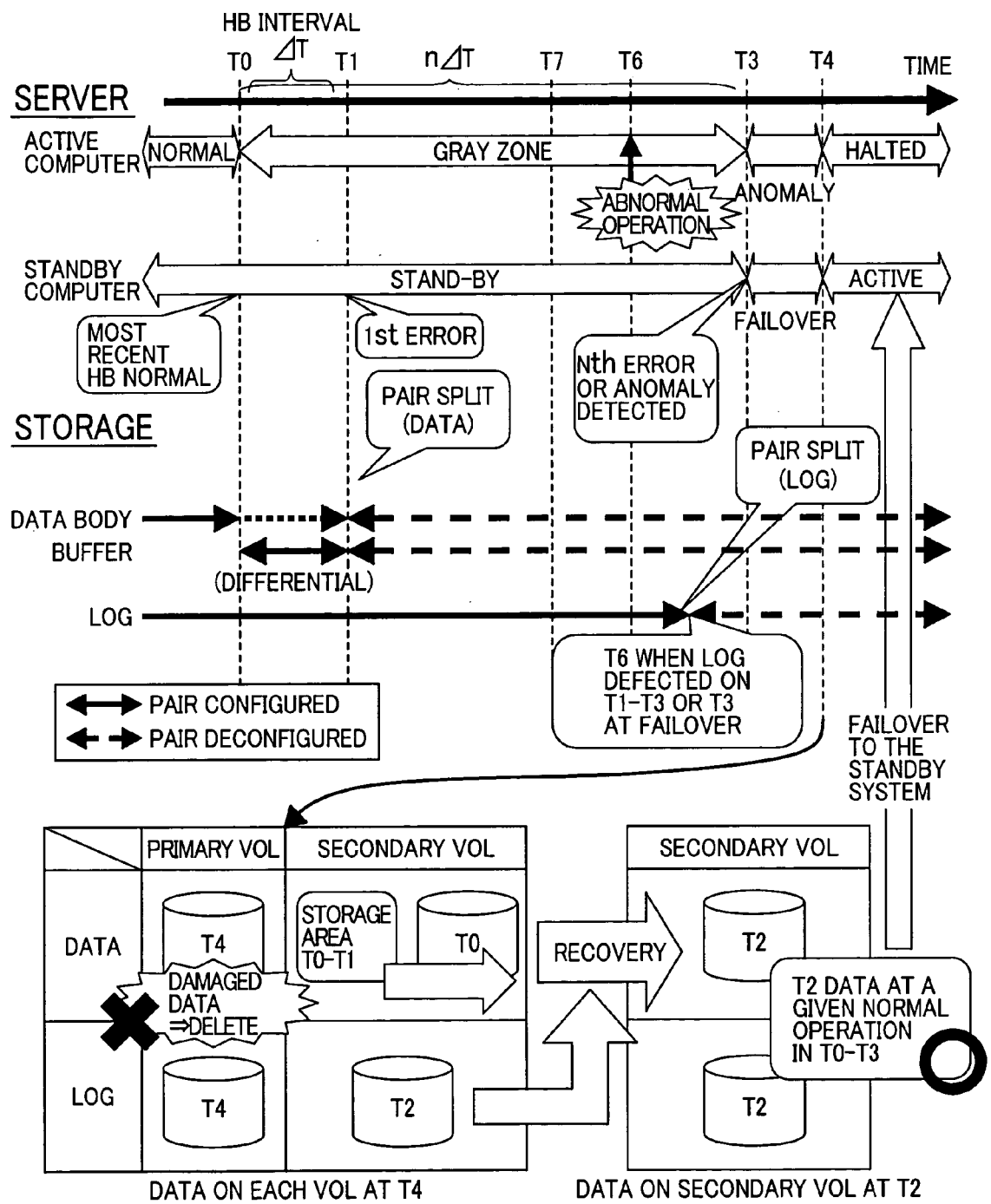
FIG. 12 is a process timing diagram illustrating the data protection against corruption that is achieved in accordance with a seventh preferred embodiment of the present invention.

FIG. 12 is a timing chart illustrating the detection of a failure and the data protection timing by the pair split using VOL replication in accordance with a seventh preferred embodiment of the present invention, incorporating the preceding second, fourth and sixth preferred embodiments. The seventh preferred embodiment provides a means for preventing the data area and log area from corrupting in the time period T0 to T3 of FIG. 2.

The data area is split at the time T1 when a failure is detected for the first time by the active server, in a manner similar to that employed in the second preferred embodiment. The data in the data area at the time of most recent assurance of data verification for a given time is held in the secondary VOL, in a manner similar to that employed in the fourth preferred embodiment. In other words, at the time T1, the data area in the secondary VOL stores the contents at the immediately preceding time T0, when the heartbeat was normal. Thus, using these techniques, the data area of the secondary VOL stores the contents at the time T0, at and after the time T1. This makes it possible to provide a snapshot of the data area much closer to the point of failure occurrence than the snapshot of the data area obtained in FIG. 11.

Next, the log area, similar to the preferred embodiment shown in FIG. 6, will be pair split when a failure has occurred at a given arbitrary time T6 in the time range from T0 to T3, which involves a corruption of the log area at the time T3, to protect the log area at the status of the time T6. Otherwise, if the log area is not corrupted in the time range T0 to T3, a pair split at the time T3 according to the second preferred embodiment will be performed to protect the log area at the status at the time T3. In other words, the valid contents of the log area at a given time T2 within the time T0 to T3 will be stored in the log area of the secondary VOL.

Using the log area of the status at the time T2 for the data area at the time T0 makes it possible to recover the data area at an arbitrary time point T2. The data area thus recovered of the status at the time T2 contains valid contents. Therefore, by taking over the data area and the log area of the status at the time T2, the stand-by computer system is allowed to take over the process at and after the time T2, between T0 and T3, where the data is valid.

As can be seen from the foregoing, the seventh preferred embodiment of the present invention protects the data area and log area from corrupting in the time period T0 to T3 so as to achieve a proper failover. More specifically, in a high availability system, a system capable of recovering data at the time when the data is valid, and of performing a proper failover, against a failure that occurs at a given time and involves the corruption of data, is achieved.

As described above, the preferred embodiments of the present invention have following effects:

At the time of failover, the VOL replication splits a paired configuration, and the backup system takes over the secondary VOL for the failover so that the data is protected to properly perform a failover against the failure involving the corruption of data in the primary VOL due to runaway of the active computer system after the failover.

In addition, by executing the pair split of the data area from the moment of first detection of a failure of the active computer system by the stand-by computer system, as well as the pair split of the log area from the moment of the Nth detection of the continuous failure involving the failover, the data area will be protected and a proper failover will be completed even when the data area is about to be corrupted in the period from the first to Nth detection of the failure.

In addition, in the paired configuration by means of the VOL replication, by providing a storage area for temporarily saving the write data from the primary VOL to the secondary VOL, a means for reading out the contents applied with the temporarily saved data without altering the contents of the secondary VOL and a means for applying the contents of the storage area to the contents of the secondary VOL are achieved. This makes it possible to achieve a VOL replication function having a secondary VOL in which the data contents in the secondary VOL are matched with the data contents in the primary VOL only when the data is verified and assured, and in which the data contents at the time when the immediately preceding data verification is assured is maintained at the time when the data verification is not assured, as well as a disk drive device having such a function.

In addition, by issuing the assurance of verified data only when the heartbeat monitor of the active and backup systems reports no error, a paired configuration can be achieved with the update of the data only when the heartbeat monitor assures that the active computer system is in proper operation. In other words, the secondary VOL is protected from updating the data with corrupted data.

In addition, by setting to the disk authorized access patterns to the VOL area on the disk, any unauthorized access violating the access patterns will be interrupted, while the access violation is reported to the superior servers. This makes it possible to prevent data corruption from concluding due to a failure.

In addition, by applying the access control of the VOL on the disk with the access patterns to the log area in the high availability database system, the log area is protected when the log area is about to be written with a write other than the proper sequential write, or when a failure has occurred that is likely to corrupt the log.

In addition, data is protected at any given time immediately before the occurrence of a failure, against a failure in the active computer system along with the corruption of data, thereby valid data is recoverable and a failover allows the stand-by computer system to take over the process even when a failure has occurred involving corruption of data.

The foregoing description of preferred embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments have been chosen and described in order to explain the principles of the invention and its practical application and to enable one skilled in the art to utilize the invention in various embodiments and with various modifications as are suited to the particular use contemplated. It is intended that the scope of the invention is defined by the claims appended hereto, and their equivalents.

What is claimed is:

1. A failover method in a redundant computer system with a storage disk device connected to an active computer system and a stand-by computer system taking over a process of said active computer system, comprising the steps of:
   generating a secondary volume on said storage disk device to maintain a paired configuration, said secondary volume being a replica of a primary volume used by said active computer system;
   pair splitting said secondary volume from said primary volume at the moment of detecting an occurrence of failure on said active computer system;
   taking over by said stand-by computer system the process performed by said active computer system by making use of said pair split secondary volume, further comprising the steps of:
   partitioning said primary and secondary volumes to a data and log areas to perform a pair split to separate said data area of the paired volumes at the moment of detecting an occurrence of a failure in said active computer system; and
   after the detection, performing a pair split to separate said log area of paired volumes at the moment of a predetermined number of times of detection of the failure in said active computer system.

2. A method of replication for use in a computer system including an active computer system, a stand-by computer system taking over a process being performed by said active computer system, and a disk drive device connected to said computer systems, said method generating a secondary volume on said disk device to maintain a paired configuration, and said secondary volume being a replica of a primary volume used by said active computer system, said method comprising the steps of:
   storing the update to be replicated from said primary volume to said secondary volume in a temporary storage area instead of directly writing to said secondary volume;
   overwriting said data stored in said temporary storage area to the data stored in said secondary volume;
   flushing data of said temporary storage area; and
   setting, by an interface, a time interval $\Delta T$ from an external computer system, said time interval $\Delta T$ assuring verified data contents of said primary volume.

3. A method of replication for use in a computer system including an active computer system, a stand-by computer system taking over a process being performed by said active computer system, and a disk drive device connected to said computer systems, said method generating a secondary volume on said disk device to maintain a paired configuration, and said secondary volume being a replica of a primary volume used by said active computer system, said method comprising the steps of:
   storing the update to be replicated from said primary volume to said secondary volume in a temporary storage area instead of directly writing to said secondary volume;
   overwriting said data stored in said temporary storage area to the data stored in said secondary volume;
   flushing data of said temporary storage area;
   assuring, by a computer system, verified data contents in said primary volume for every interval of $\Delta T$;
   storing, during the period of said $\Delta T$, the update contents in a temporary storage area by said first step; and
   performing, at the moment of assurance of verified data contents, said second step.

4. A method of replication set forth in claim 3, further comprising the steps of:
   performing a pair split to separate said secondary volume from said primary volume, at the moment of detecting the occurrence of a failure in said active computer system; and
   taking over by said stand-by computer system the process being performed by said active computer system by making use of said pair split secondary volume.

5. A method of replication set forth in claim 4, in which:
   said stand-by computer system reads out the data on said secondary volume along with the data stored in said temporary storage area to update the data stored in said secondary volume with said data stored in said temporary storage area to take over the process.

* * * * *